(12) United States Patent
Geiner et al.

(10) Patent No.: US 6,539,389 B1
(45) Date of Patent: *Mar. 25, 2003

(54) PACING THE FREQUENCY AT WHICH SYSTEMS OF A MULTISYSTEM ENVIRONMENT COMPRESS LOG STREAMS

(75) Inventors: Robert Vaughn Geiner, Poughkeepsie, NY (US); Steven Jay Greenspan, Hyde Park, NY (US); Stephen Joseph Kinder, Hyde Park, NY (US); Douglas Michael Zobre, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/262,587

(22) Filed: Mar. 4, 1999

(51) Int. Cl.[7] ............................................... G06F 17/30

(52) U.S. Cl. .............................. 707/101; 707/1; 707/8; 707/10

(58) Field of Search ............................. 707/1–10, 101; 709/203, 216, 321; 717/203, 207, 206

(56) References Cited

U.S. PATENT DOCUMENTS

| | | | | | |
|---|---|---|---|---|---|
| 4,811,249 | A | * | 3/1989 | Marsh | 702/187 |
| 5,537,588 | A | * | 7/1996 | Engelmann et al. | 707/202 |
| 5,966,708 | A | * | 10/1999 | Clark et al. | 707/101 |
| 6,021,408 | A | * | 2/2000 | Ledain et al. | 707/8 |
| 6,208,273 | B1 | * | 3/2001 | Dye et al. | 710/68 |
| 6,275,826 | B1 | * | 8/2001 | Geiner et al. | 707/101 |
| 6,438,609 | B1 | * | 8/2002 | Geiner et al. | 709/247 |

\* cited by examiner

Primary Examiner—Hosain T. Alam
Assistant Examiner—Anh Ly
(74) Attorney, Agent, or Firm—Lily Neff, Esq.; Andrew J. Wojnicki, Jr., Esq.; Heslin Rothenberg Farley & Mesiti P.C.

(57) ABSTRACT

The frequency at which a multisystem log stream is compressed by a system of a multisystem environment is adjusted in real-time. The rate at which the multisystem log stream is compressed by the system is ascertained. That rate is relative to how frequently the multisystem log stream is compressed by other systems of the multisystem environment. The frequency with which the system compresses the multisystem log stream is then adjusted in real-time. Thus, the frequency at which one system of the multisystem environment compresses the log stream is relative to the frequency at which other systems of the multisystem environment are compressing the log stream.

19 Claims, 12 Drawing Sheets

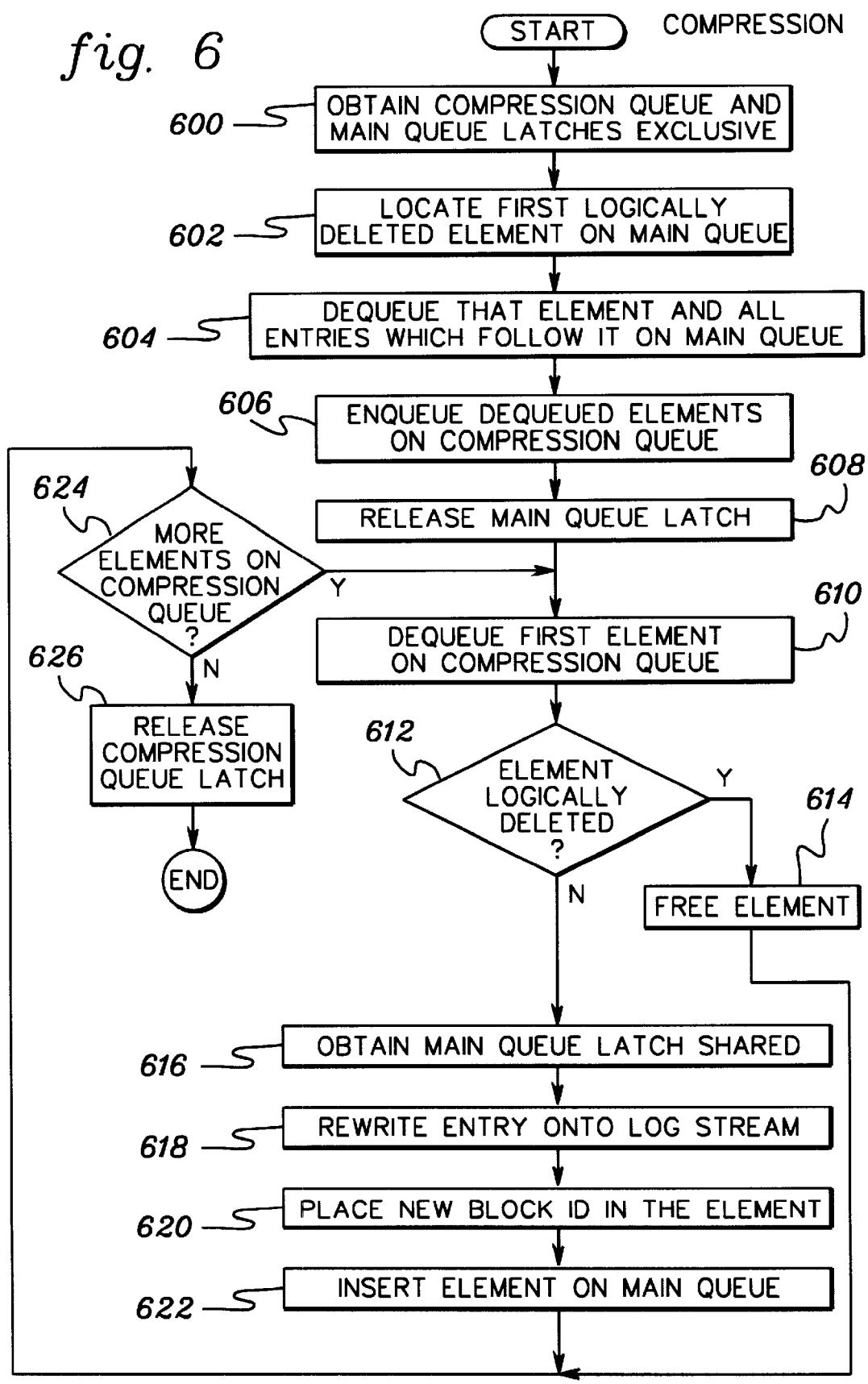

PACING THE FREQUENCY AT WHICH SYSTEMS OF A MULTISYSTEM ENVIRONMENT COMPRESS LOG STREAMS

CROSS REFERENCE TO RELATED APPLICATIONS

This application contains subject matter which is related to the subject matter of the following applications, each of which is assigned to the same assignee as this application, and each of which is hereby incorporated herein by reference in its entirety:

"Method Of Pacing The Frequency At Which Systems Of A Multisystem Environment Compress Log Streams," by Geiner et al., Ser. No. 09/262,250, filed on Mar. 4, 1999;

"Program Products For Pacing The Frequency At Which Systems Of A Multisystem Environment Compress Log Streams," by Geiner et al., U.S. Pat. No. 6,275,826, issued on Aug. 14, 2001;

"Tail Compression Of A Sparse Log Stream Of A Computer System," by Clark et al., U.S. Pat. No. 5,920,875, issued on Jul. 6, 1999;

"Tail Compression Of A Log Stream Using A Scratch Pad Of Logically Deleted Entries," by Clark et al., U.S. Pat. No. 5,966,708, issued on Oct. 12, 1999;

"System Of Compressing A Log Stream Using A Scratch Pad Of Logically Deleted Entries," by Clark et al., U.S. Pat. No. 6,108,667, issued on Aug. 22, 2000;

"A Method of One System Of A Multisystem Environment Taking Over Log Entries Owned By Another System," by Clark et al., U.S. Pat. No. 6,076,095, issued on Jun. 13, 2000;

"One System Of A Multisystem Environment Taking Over Log Entries Owned By Another System," by Clark et al., U.S. Pat. No. 6,092,084, issued on Jul. 18, 2000;

"System Of Compressing The Tail Of a Sparse Log Stream Of A Multisystem Environment," by Clark et al., U.S. Pat. No. 6,125,393, issued on Sep. 26, 2000;

"System Of Compressing The Tail Of A Sparse Log Stream Of A Computer System," by Clark et al., U.S. Pat. No. 5,956,735, issued on Sep. 21, 1999;

"Tail Compression Of A Sparse Log Stream Of A Multisystem Environment," by Clark et al., U.S. Pat. No. 5,999,935, issued on Dec. 7, 1999; and "Method And System For Log Management In A Coupled Data Processing System," by Geiner et al., U.S. Pat. No. 5,737,600, issued on Apr. 7, 1998.

TECHNICAL FIELD

This invention relates, in general, to the management of log streams of a multisystem environment and, in particular, to pacing the frequency at which the log streams are compressed by systems of the multisystem environment.

BACKGROUND ART

In various computer systems, historical log data is maintained in, for instance, log files for use in system recovery, problem determination and/or system maintenance. Typically, these log files have a limited amount of capacity to retain the historical data. After the capacity is met, at least some of the data records are moved from the log files to external storage devices, such as direct access storage devices (DASD), thereby providing additional space in the log files for more data.

At some point, data within the log files and/or on the external storage devices is no longer needed. For example, there is no need to keep the data once it passes its retention requirements. The saving of data past its usefulness adversely affects system performance in a number of ways. For instance, when unnecessary data is retained and a log file needs to be browsed to recover logged data during recovery of a failure, the browser may have to deal with potentially large amounts of unnecessary data, thereby slowing down the recovery process. Additionally, when the saving of unwanted data records requires the use of external storage devices, which typically provide slower access to the data, the reading of the data takes longer, thus, affecting system performance.

Therefore, it is beneficial to delete any unnecessary data from the log files. This is accomplished by compressing the log files and then physically deleting any entries that can be deleted. When a log file is used by various systems of a multisystem environment, each of the systems is responsible for compressing and deleting its unwanted entries.

When the systems of the multisystem environment are processing at different transaction rates, however, and the slower system does not adequately compress the log file at a rate commensurate with the faster system, the slower system adversely affects the performance of the faster system. This is true regardless of whether the reason for the disparity in transaction rates is hardware performance characteristics or work load differences. Thus, the faster system potentially has many more elements in the log file than the slower system, and the elements of the faster system can be separated by a single element written by the slower system. This problem may be exacerbated when there are several fast systems and only one slow system.

Based on the foregoing, a need exists for a capability that provides for the pacing of the frequency at which a system compresses a multisystem log file. A further need exists for a capability that allows each system to adjust its compression rate based on the compression rates of the other systems, thus ensuring a minimal sized log file. A further need exists for a pacing technique that allows the frequency of compression to be adjusted in real-time based on the current transaction rates of the systems connected to the log file.

SUMMARY OF THE INVENTION

The shortcomings of the prior art are overcome and additional advantages are provided through the provision of a pacing system for pacing the frequency at which multisystem log streams are compressed. The pacing system includes, for instance, means for ascertaining a rate at which a multisystem log stream is compressed by one system of a multisystem environment. The rate is relative to how frequently the multisystem log stream is compressed by at least one other system of the multisystem environment. The pacing system further includes means for adjusting, in real-time, the frequency at which the one system compresses the multisystem log stream.

In one example, the means for ascertaining includes checking a compress lag count of the one system. The compress lag count represents the rate at which the one system is compressing the multisystem log stream relative to how frequently the multisystem log stream is compressed by the at least one other system.

In a further embodiment, the means for adjusting includes means for increasing the frequency at which the one system compresses the multisystem log stream, when the ascertained rate indicates that the one system is compressing the multisystem log stream at a slower rate than the at least one other system. In one example, the means for increasing the frequency includes forcing a compression to be performed by the one system.

In a further embodiment of the invention, the pacing system includes means for comparing, at predefined time intervals, the ascertained rate to a predefined value to determine whether the frequency at which the one system compresses is to be adjusted.

In a further embodiment of the invention, a pacing system for pacing the frequency at which multisystem log streams are compressed is provided. The pacing system includes, for instance, means for ascertaining a rate at which a multisystem log stream is compressed by one system of a multisystem environment; means for comparing, at predefined time intervals, the ascertained rate to a predefined value to determine whether the frequency at which the one system compresses the multisystem log stream is to be adjusted; means for adjusting, in real-time, the frequency at which the one system compresses the multisystem log stream, when the comparing indicates adjusting; means for determining whether the time of the predefined time intervals is to be modified; and means for modifying the time of the predefined time intervals to adjust how often the comparing is performed, when it is determined that the time is to be modified.

In yet another aspect of the present invention, a pacing system for pacing the frequency at which multisystem log streams are compressed is provided. The pacing system includes, for instance a system of a multisystem environment adapted to ascertain a rate at which a multisystem log stream is compressed by the system. The rate is relative to how frequently the multisystem log stream is compressed by at least one other system of the multisystem environment. The system is further adapted to adjust, in real-time, the frequency at which the system compresses the multisystem log stream.

The compression pacing capability of the present invention advantageously adjusts, in real-time, the frequency at which systems compress a multisystem log stream. Each system adjusts its compression rate based on the compression rates of the other systems, ensuring a minimal sized log stream. This increases the likelihood that the log stream can be contained solely in the coupling facility, and decreases the likelihood of degrading system performance caused by offloading active data onto external storage devices. The technique of the present invention advantageously handles permanent transaction rate differences, such as different processor capacities, as well as temporal changes, like spikes in transaction rates. The log stream compression pacing of the present invention is based on heuristics, and the frequency of the compression is adjusted in real-time based on the current transaction rates (i.e., the writes to the log stream).

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 depicts one embodiment of the logic used to compress the primary log stream of FIG. 2;

BEST MODE FOR CARRYING OUT THE INVENTION

In accordance with the principles of the present invention, the frequency at which a multisystem log stream is compressed by a particular system of a multisystem environment is adjusted, in real-time. The adjustment depends on how frequently other systems of the multisystem environment are compressing the multisystem log stream.

Figure 1:
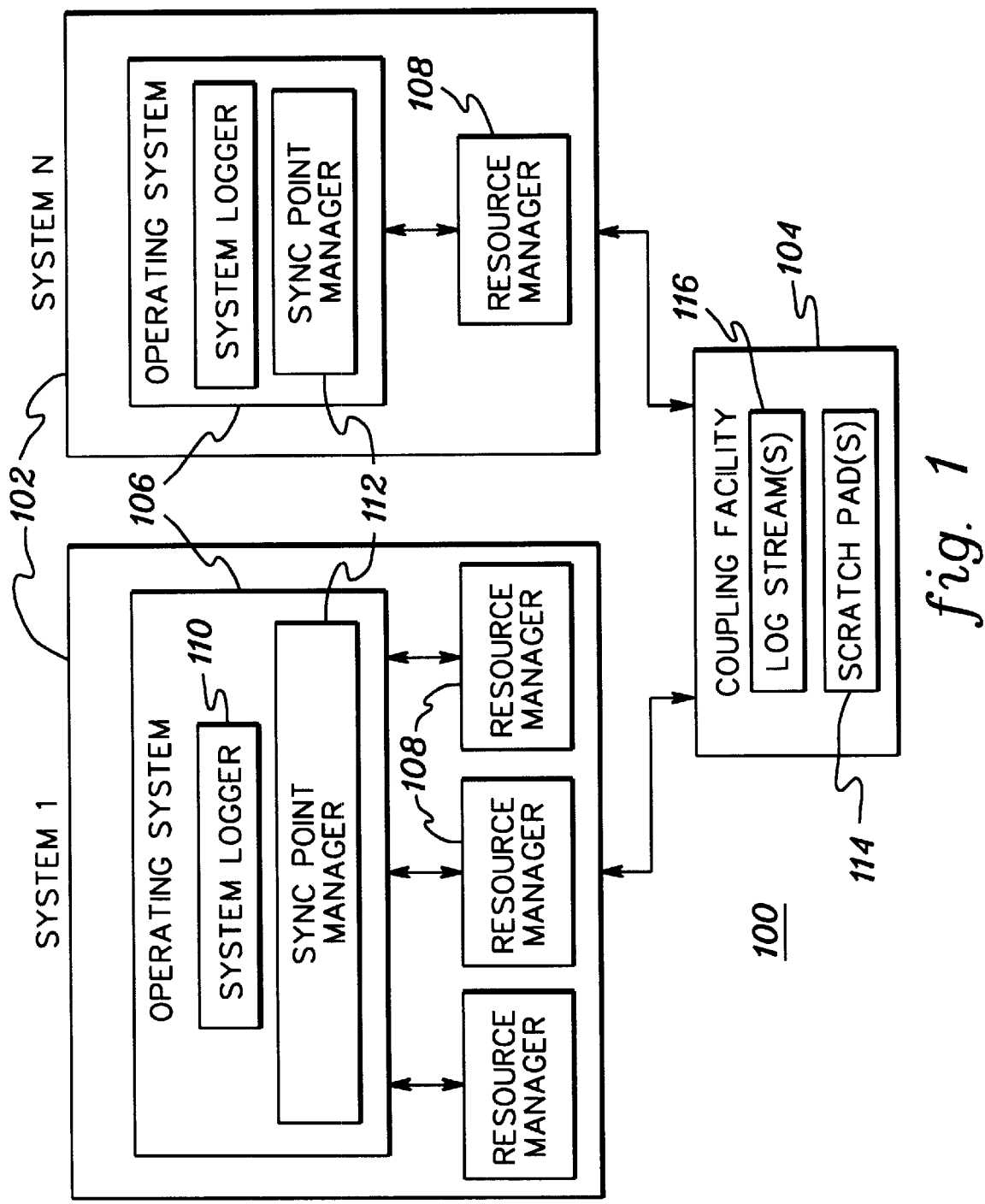
FIG. 1 depicts one example of a multisystem environment incorporating and using the log stream compression pacing capability of the present invention.

One example of a multisystem environment incorporating and using the compression pacing capability of the present invention is depicted in FIG. 1. Multisystem environment 100 includes one or more systems 102 coupled to a coupling facility 104. Each system 102 is based on the Enterprise Systems Architecture (ESA)/390 offered by International Business Machines Corporation, and includes an operating system 106 and one or more resource managers 108, each of which is described below.

In one embodiment, operating system 106 is the Multiple Virtual Storage (MVS) operating system (or the OS/390 operating system) offered by International Business Machines Corporation. Operating system 106 includes, for instance, a system logger component 110 and a sync point manager 112.

System logger component 110, which runs in its own address space started by the operating system, is involved in the compressing of log streams, as described below. One embodiment of a system logger is described in MVS Programming Assembler Services Reference, IBM Publication No. GC28-1910-01 (September 1996); and MVS Programming Assembler Services Guide, IBM Publication No. GC28-1762-01 (September 1996), each of which is hereby incorporated herein by reference in its entirety.

Sync point manager 112 coordinates participants (such as resource managers) in a 2-phase commit protocol. One example of a sync point manager is a Resource Recovery Service, which is offered by International Business Machines corporation and is described in MVS Programming: Resource Recovery, IBM Publication No. GC28-1739-03 (September 1998), which is hereby incorporated herein by reference in its entirety. The sync point manager is involved in the compression pacing technique of the present invention, as described below.

Each of resource managers 108 owns and controls a set of resources within the computer system. For example, a resource manager can be a database management facility, such as IMS or DB2, which is offered by International Business Machines Corporation.

As mentioned above, each system 102 is coupled to coupling facility 104. Coupling facility 104 (a.k.a., a structured-external storage processor(SES)) is a shareable facility that contains storage accessible by the systems and performs operations requested by the resource managers and/or programs running within the systems. Examples of a coupling facility are described in detail in U.S. Pat. No. 5,317,739, entitled "Method and Apparatus for Coupling Data Processing Systems," by Elko et al., issued May 31, 1994, and in U.S. Pat. No. 5,737,600, entitled, "Method And System For Log Management In A Coupled Data Processing System," by Geiner et al., issued Apr. 7, 1998, both assigned to International Business Machines Corporation, and each of which is hereby incorporated herein by reference in its entirety.

Coupling facility 104 includes, for instance, one or more scratch pads 114 and one or more log streams 116. Each scratch pad 114 may contain data used by the present invention, as described further below, and in one example, is created by the first system logger that attempts to read the scratch pad. As one example, each log stream has an associated scratch pad.

Each log stream 116 is accessible by one or more of the systems of the multisystem environment and is capable of containing one or more entries for the systems. For each log stream, at least a portion of the log stream can be stored in one or more storage devices (e.g., direct access storage device (DASD)), when, for example, sufficient space for the log stream no longer exists within the coupling facility.

Figure 2:
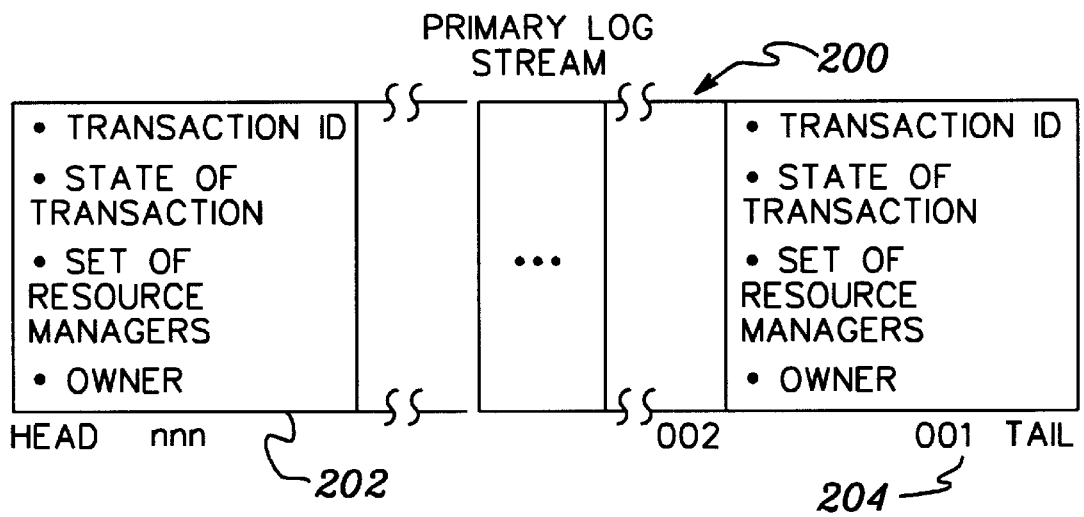
FIG. 2 depicts one example of a primary log stream of the multisystem environment of FIG. 1, which is managed in accordance with the principles of the present invention.

One example of a log stream is described in detail with reference to FIG. 2. Log stream 200, referred to herein as a primary log stream, includes information about the transactions processing on the systems, as well as the resource managers involved in those transactions. The information is written to the primary log stream by, for instance, the system loggers upon direction from the sync point managers.

In one embodiment, primary log stream 200 includes a number of log blocks or log entries 202, each including various data, such as a transaction identifier, the state of the transaction (e.g., committed, back-out), the set of resource managers associated with the transaction identified by the transaction id, and the name of the system that owns the entry (i.e., the system that wrote the data to the primary log stream). Each log entry has a block id 204, which represents, for instance, a relative offset into the log stream. In one example, the smaller the block id, the older the data.

One end of the primary log stream is referred to herein as the tail or rear of the log stream. In one embodiment, the rear of the log stream typically includes the oldest entry of the log stream (i.e., the entry with the smallest block id). The other end of the log stream is referred to herein as the head, which is forward from the tail or rear. (In another embodiment, it may be the head instead of the tail, which typically holds the oldest entry.)

Primary log stream 200 may have additional data, which need not be described for the present invention. The primary log stream is only one example of a log stream managed by the present invention. Other log streams can also be managed by the techniques of the present invention. Further, in another embodiment of the invention, the log streams are not included in a coupling facility, but are instead stored in shared storage, such as, for instance, shared external storage devices (e.g., DASD).

Entries are added to log stream 200 by the systems connected to the log stream. (One embodiment for connecting to a log stream is described in detail in U.S. Pat. No. 5,999,935, entitled "Tail Compression Of A Sparse Log Stream Of A Multisystem Environment", issued Dec. 7, 1999, which is hereby incorporated herein by reference in its entirety.) For example, data is written to a log stream by one or more system loggers under direction of one or more of the sync point managers. In particular, the sync point managers request that the data be written to the log stream for one or more of the resource managers.

One embodiment of adding entries to a log stream is described in detail in U.S. Pat. No. 5,920,875, entitled "Tail Compression Of A Sparse Log Stream Of A Computer System," by Clark et al., issued Jul. 6, 1999, and in U.S. Pat. No. 5,956,735, entitled "System Of Compressing The Tail Of A Sparse Log Stream Of A Computer System," by Clark et al., issued Sep. 21, 1999, each of which is hereby incorporated herein by reference in its entirety.

One example of adding entries to log stream 200 is also described in detail with reference to FIG. 3. In the one illustrative example described below, the sync point manager of a system (e.g., System X) requests data to be written by the system logger to primary log stream 200. This sync point manager is referred to herein as Sync Point Manager X. The same logic is used, however, by the other sync point managers (or any other components or entities) that wish to write information to the log stream.

Figure 3:
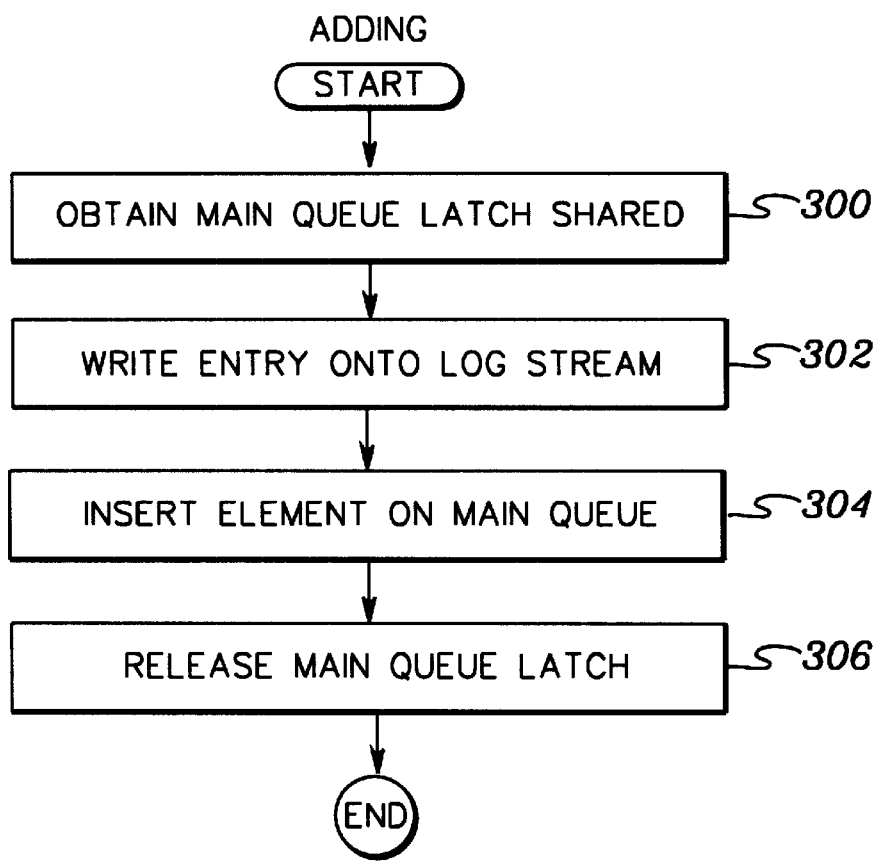
FIG. 3 depicts one embodiment of the logic used in adding new entries to the primary log stream of FIG. 2.
Figure 4:
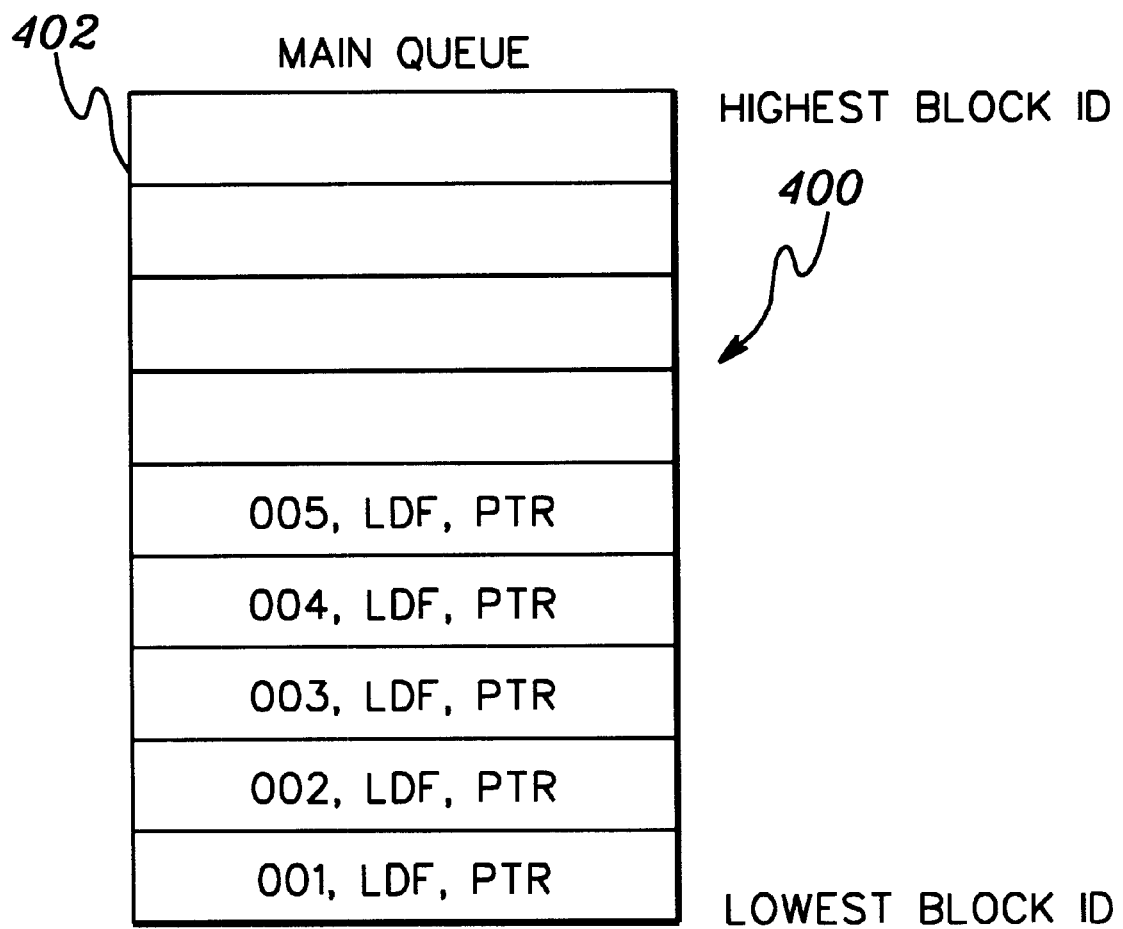
FIG. 4 depicts one embodiment of a main queue used in accordance with the principles of the present invention.

Referring to FIG. 3, initially, a shared serialization resource (e.g., an MVS/ESA shared latch) is obtained for a main queue located within System X, STEP 300. The shared latch allows multiple entities, if any, to concurrently access the queue. The main queue is used to hold elements representative of entries within the primary log stream. One example of a main queue 400 is depicted in FIG. 4.

Main queue 400 is located, in one example, within the storage of System X. Each system that writes to the log stream has its own main queue. In one instance, main queue 400 includes one or more elements 402. Each element includes a representation of an entry written onto the primary log stream. For instance, each element includes the block id of the corresponding log stream entry, and a logical deletion flag (LDF), which is described below. In this example, the data for the entry is not maintained within the queue, but stored separately in, for instance, main store, a cache, auxiliary storage, external storage devices, a coupling facility or any combination thereof. Thus, each element also includes a pointer (PTR) to the corresponding data for the entry represented by the element.

Returning to FIG. 3, subsequent to obtaining the latch, a new entry is added to the log stream and given a block id, STEP 302. In one example, the entry is written to the head of the log stream, and system logger 110 ensures that the block id is greater than the block ids already assigned by any of the systems.

Thereafter, a new element, referred to as an LGB, is inserted onto main queue 400 of System X in order of the block id, STEP 304. In one example, the highest block id is at the top of the queue. In particular, the element is enqueued using compare and swap logic. This provides serialization for the queue, such that multiple updates to the queue are not occurring at the same time.

Subsequently, the latch is released, STEP 306, and the addition process by System X is complete.

When an entry on the log stream is no longer needed (e.g., its retention requirements have been met), then the entry is logically deleted. In particular, the entry physically remains on the log stream, but an LGB associated with the entry is marked as logically deleted.

One embodiment of logically deleting entries is described in detail in U.S. Pat. No. 5,920,875, entitled "Tail Compression Of A Sparse Log Stream Of A Computer System," by Clark et al., issued Jul. 6, 1999, and in U.S. Pat. No. 5,956,735, entitled "System Of Compressing The Tail Of A Sparse Log Stream Of A Computer System," by Clark et al., issued Sep. 21, 1999, each of which is hereby incorporated herein by reference in its entirety.

One example of logically deleting an entry of the log stream is also described in detail with reference to FIG. 5. In the one illustrative example described below, it is Sync Point Manager X that is logically deleting an entry from primary log stream 200. The same logic is used, however, by the other sync point managers (or other components or entities) that wish to logically delete information from a log stream.

Figure 5:
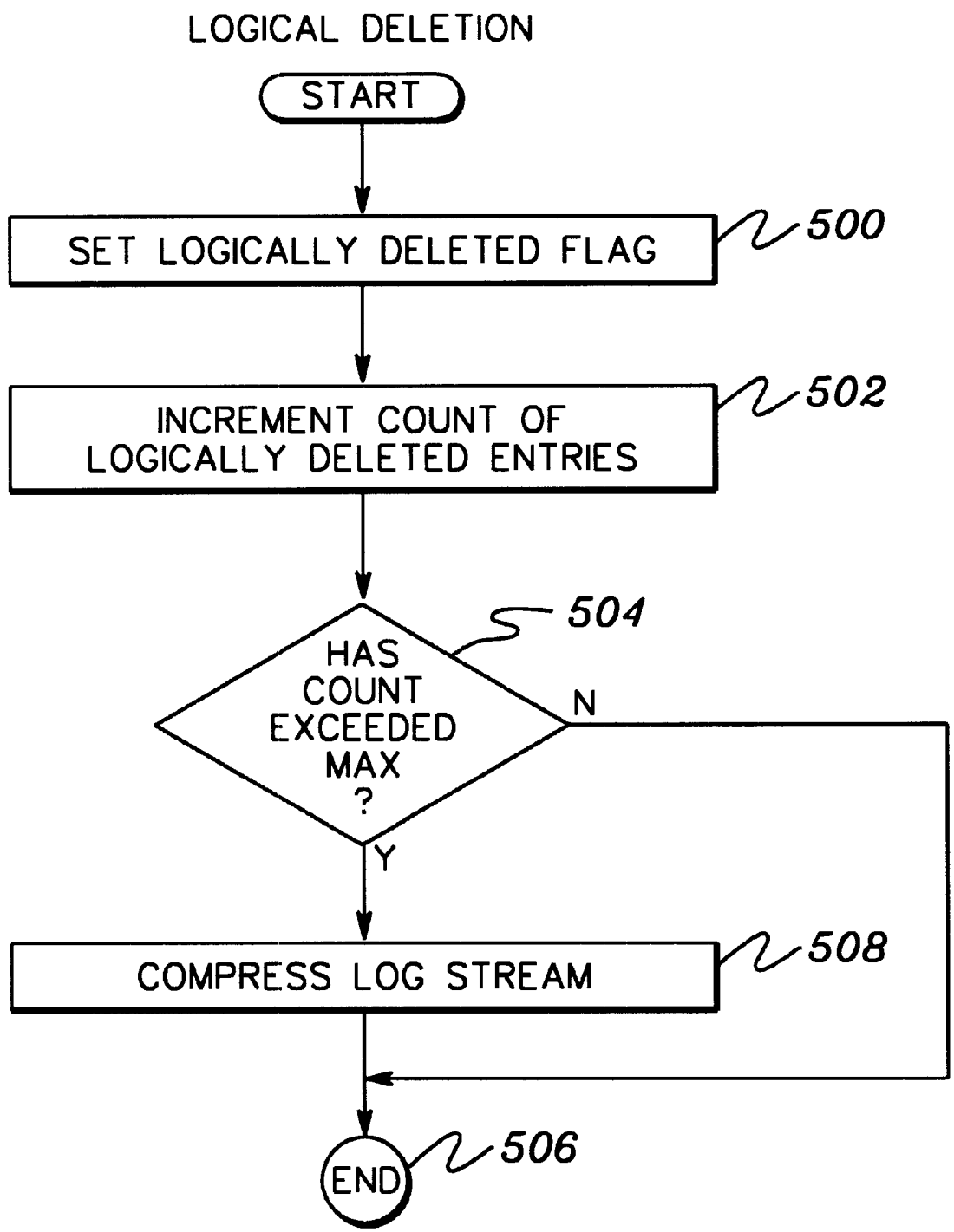
FIG. 5 depicts an embodiment of the logic used to logically delete an entry from the primary log stream of FIG. 2, in accordance with the principles of the present invention.

Referring to FIG. 5, initially, the logical deletion flag for the entry to be deleted is set in the main queue corresponding to System X, STEP 500. This flag indicates that the entry is no longer needed (i.e., it is inactive) and can be physically removed from the log stream at the appropriate time.

Subsequently, a count of logically deleted elements for System X is incremented by one, STEP 502. This count is maintained, for instance, within the storage of System X; however, it also can be maintained within the coupling facility or on external storage devices, as other examples.

Next, a determination is made as to whether the count has exceeded a predetermined maximum value (e.g., 100 logical deletes), STEP 504. If the count has not exceeded its limit, then the logical deletion procedure is complete, STEP 506. However, if the count has exceeded the limit, then log stream 200 is compressed, STEP 508.

One embodiment of compressing a log stream is described in detail in U.S. Pat. No. 5,920,875, entitled "Tail Compression Of A Sparse Log Stream Of A Computer System," by Clark et al., issued Jul. 6, 1999, and in U.S. Pat. No. 5,956,735, entitled "System Of Compressing The Tail Of A Sparse Log Stream Of A Computer System," by Clark et al., issued Sep. 21, 1999, each of which is hereby incorporated herein by reference in its entirety.

One example of compressing a log stream by, for instance, the sync point manager of System X, is also described in detail with reference to FIG. 6. Initially, the latch for the main queue of System X is obtained exclusively, thereby preventing any other entity within the system from writing to the queue, until the latch is released, STEP 600. Additionally, a latch for a compression queue is obtained exclusively.

The compression queue includes entries to be processed during the log stream compression, as described below. In one example, there is a compression queue for each system that can be connected to the log stream. Each compression queue is stored, for instance, in the particular systems' storage. (In another embodiment, the compression queue may be stored in a shared facility, such as the coupling facility.) The elements of a compression queue have the same format as the elements of the main queue.

Subsequent to obtaining the exclusive latches, the first element (i.e., LGB) on the main queue of System X that has been logically deleted is located, STEP 602. For example, the logical deletion flag for each element of the main queue, starting at the last element written to the queue, is checked until the element having a set flag is found.

Next, the first element on the main queue that has been logically deleted, as well as all the other entries which follow it (these entries are referred to herein as entries of a compressible set or entries within a compression zone) are dequeued from the main queue, STEP 604, and enqueued onto the compression queue, STEP 606.

Figure 7A:
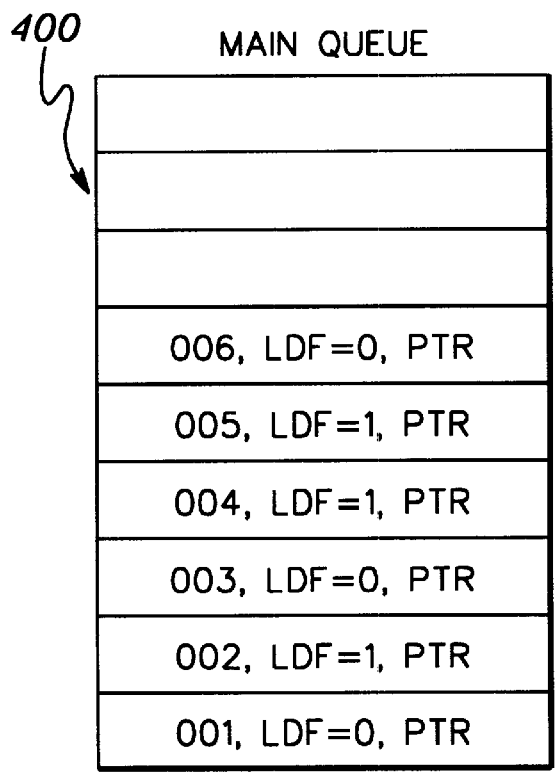
FIG. 7a depicts another example of the main queue of FIG. 4 used in accordance with the principles of the present invention.
Figure 7B:
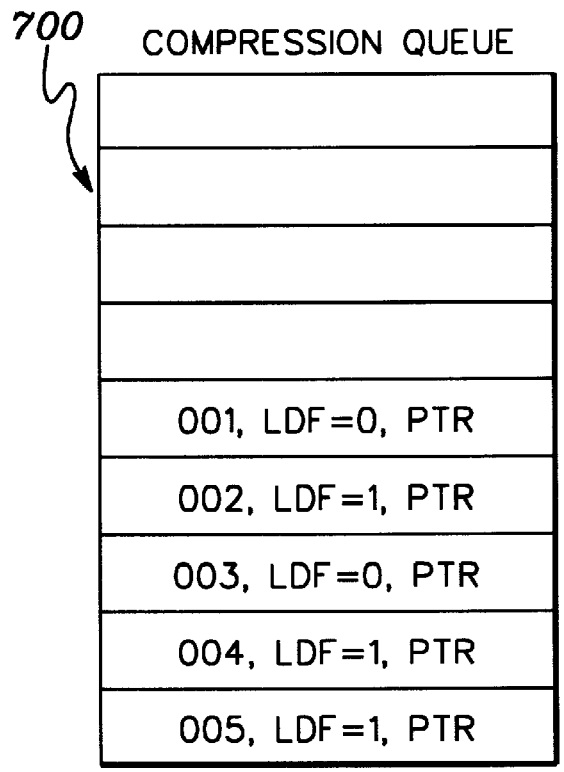
FIG. 7b depicts one example of a compression queue used in accordance with the principles of the present invention.

For example, referring to the illustrations depicted in FIGS. 7a and 7b, if the first element on main queue 400 that is logically deleted (LDF=1) corresponds to block id 005, then block id 005 is removed from the main queue and placed on a compression queue 700 for System X, along with block ids 004–001.

Returning to FIG. 6, subsequently, the main queue latch is released, STEP 608. Thereafter, the first element on compression queue 700 is dequeued (e.g., block id 001), STEP 610, and a determination is made as to whether that element is logically deleted, INQUIRY 612. If the element is logically deleted (LDF=1), then that element is freed (e.g., put on a free queue for reuse by the compression technique), STEP 614.

Figure 8:
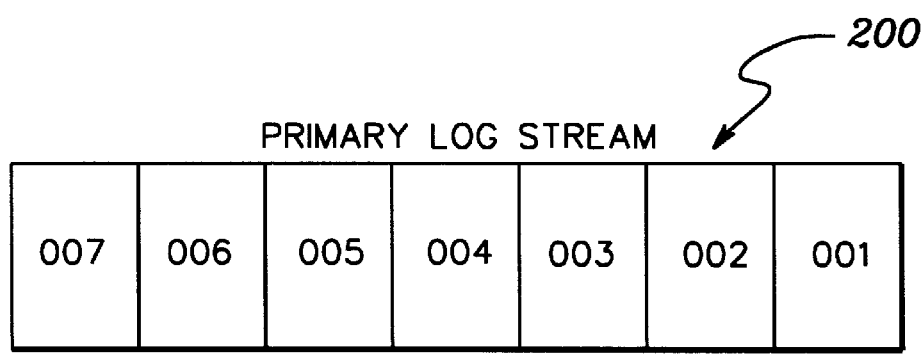
FIG. 8 depicts another example of the primary log stream of FIG. 2, in which the first entry has been rewritten as the seventh entry, in accordance with the principles of the present invention.

If, however, the element is not logically deleted (LDF=0), then the main queue latch is obtained shared, STEP 616, and the log entry corresponding to the element is rewritten onto the log stream, STEP 618. For example, the log stream entry having block id 001 has not been logically deleted, in this one illustrative example (see the element of FIG. 7b having block id 001), thus, the log stream entry represented by block id 001 is rewritten to another location within the log stream. In particular, in one example, a copy of the contents of block id 001 is obtained from storage (as indicated by the pointer located in the compression queue) and placed in an entry at the head of the log stream. That entry is. then given a new block id (e.g., block id 007 (see FIG. 8)). When an entry is given a new block id, it is considered herein as a new entry, even though the data located in the entry may be older than the data of other entries.

Returning to FIG. 6, in addition to the above, the new block id (e.g., block id 007) is placed in an element, STEP 620, which is inserted onto the main queue in order of block id, STEP 622.

Subsequent to inserting the element on the main queue or after the element has been freed, a determination is made as to whether there are more elements on the compression queue to be processed, INQUIRY 624. If there are more elements, processing continues at STEP 610 "DEQUEUE FIRST ELEMENT ON COMPRESSION QUEUE." However, if there are no more entries to be processed, then the compression queue latch is released, STEP 626, and compression is complete.

Figure 9:
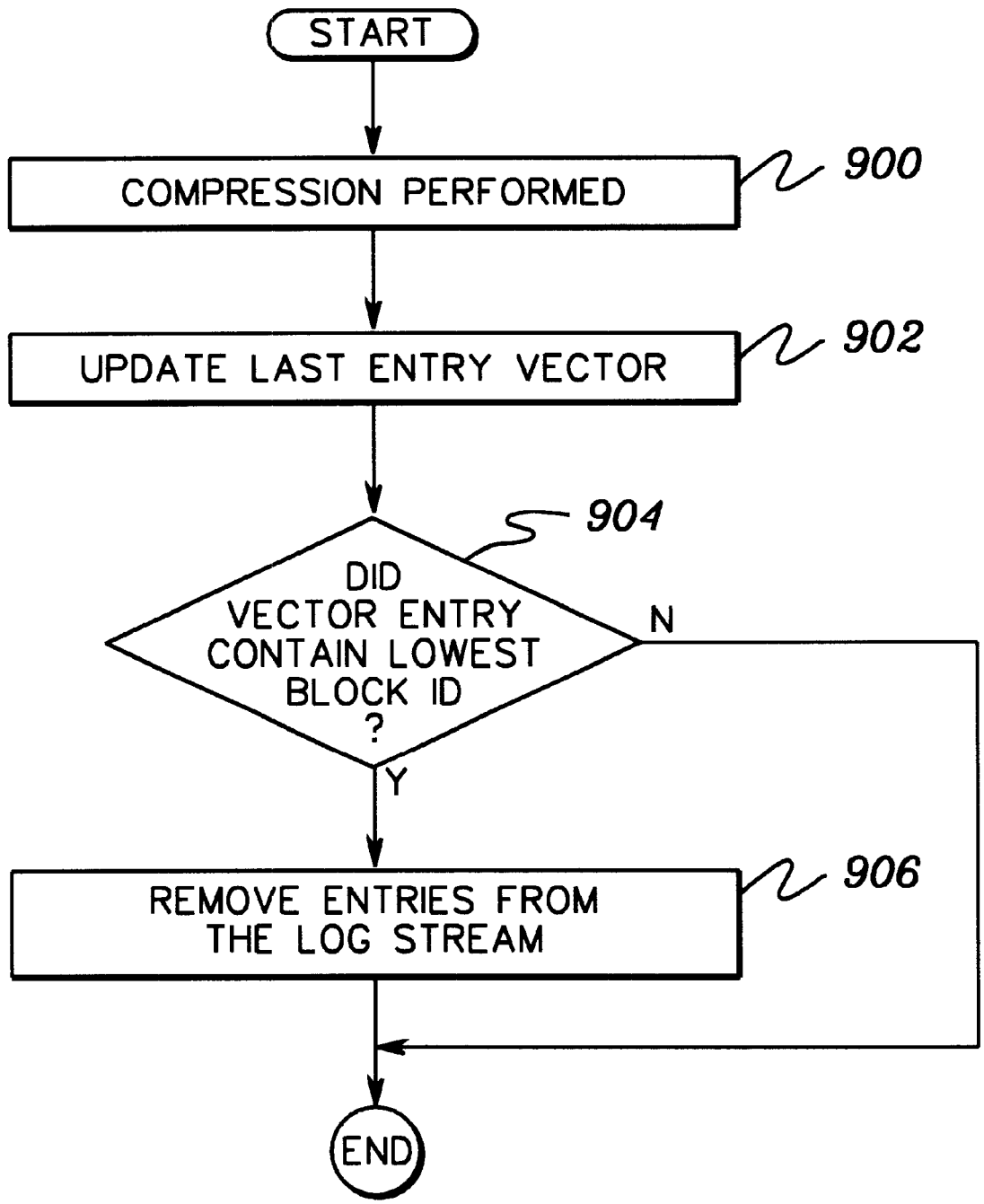
FIG. 9 depicts one embodiment of the logic used to physically remove logically deleted entries from the primary log stream of FIG.2.

Referring to FIG. 9, whenever each system performs its compression, STEP 900, the system updates a vector, referred to as a last entry vector, in order to reflect the compression, STEP 902.

Figure 10A:
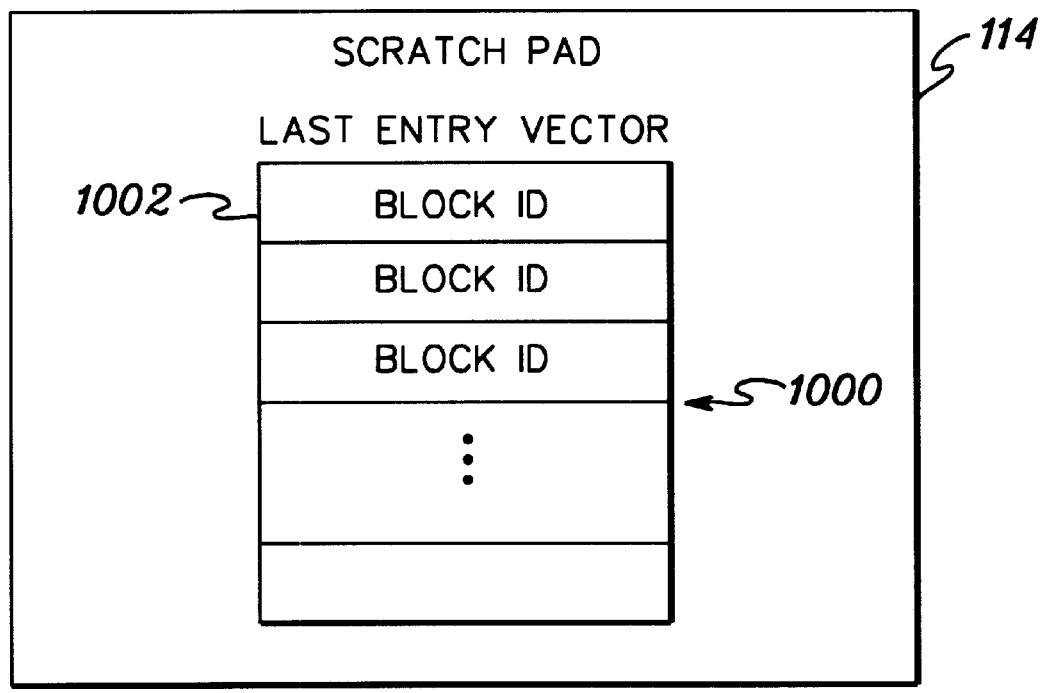
FIGS. 10a and 10b depict examples of a last entry vector updated during the tail deletion of FIG. 9.

One embodiment of a last entry vector is depicted in FIG. 10*a*. Last entry vector 1000 includes an entry 1002 for each system that could potentially participate in writing entries to the log stream. For instance, if the multisystem environment includes three systems, System X, System Y and System Z, that could write to the log stream, then there would be three entries in the vector. Each entry includes the block id of the oldest log entry (e.g., the smallest block id) in the primary log stream needed by the respective system.

Figure 10B:
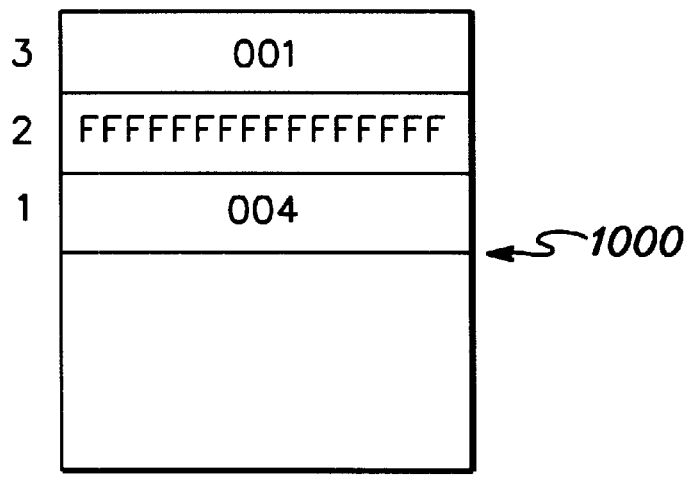

For example, if entry 1 of vector 1000 corresponds to System X and the oldest block id System X still needs is 004, then block id 004 is placed in vector entry 1 (see FIG. 10*b*). Similarly, if entry 3 corresponds to System Z and block id 001 is the oldest block id needed by System Z, then block id 001 is place in entry 003. Further, a value of the highest possible block id (e.g., x'FFFFFFFFFFFFFFFF') is placed in any vector entry corresponding to a disconnected system, such as System Y.

As one example, last entry vector 1000 is created within scratch pad 114 of coupling facility 104 using a set of services provided by system logger 110. In other embodiments, the last entry vector is maintained on a shared external storage device (e.g., DASD) or copies of the vector are maintained in main storage, a cache, or auxiliary storage of each system. Other examples are also possible and included within the spirit and scope of the present invention.

Returning to STEP 902 of FIG. 9, last entry vector 1000 is updated with the block id of the oldest entry System X still needs. This is accomplished, in one example, by using a compare and swap protocol, which ensures that the vector is only changed by one system at a time. The block id to be placed in the entry is the lowest block id in main queue 400 of System X that has not been logically deleted.

After updating the vector, a determination is made as to whether the vector entry that it replaced previously contained the lowest block id of the vector, INQUIRY 904. If it did not contain the lowest block id, then no further action is taken. However, if it did contain the lowest block id, then the sync point manager requests the system logger of System X (in this example) to delete the log tail of all the entries lower than the new lowest block id in the vector, STEP 906.

Figure 11A:
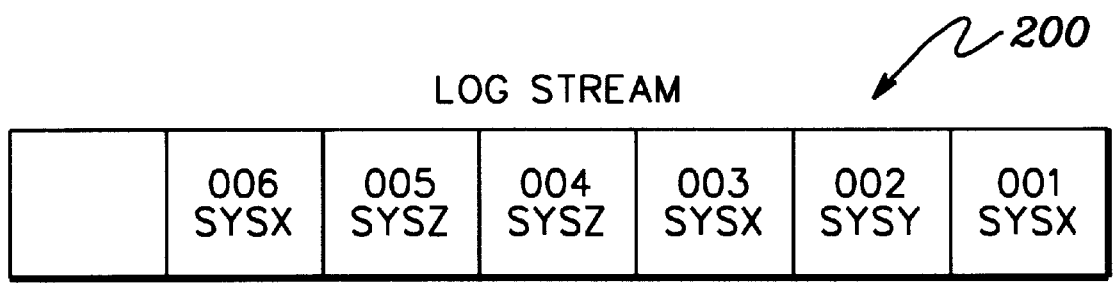
FIG. 11a depicts another example of the primary log stream of FIG. 2 managed in accordance with the principles of the present invention.
Figure 11B:
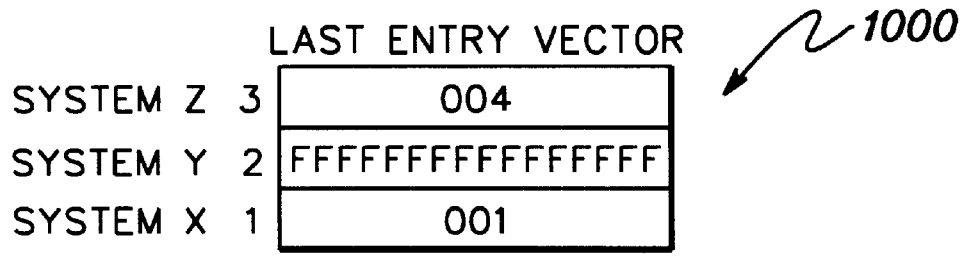
FIGS. 11b–11c depict other examples of the last entry vector of FIG. 10a used in accordance with the principles of the present invention.
Figure 11C:
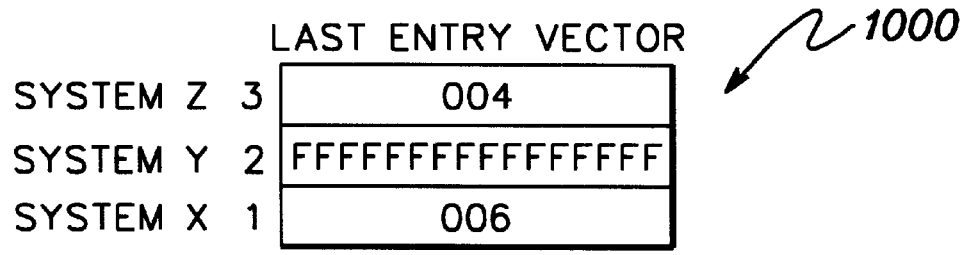

For example, assume a log stream has entries written to it by three systems, System X, System Y and System Z (see FIG. 11*a*). Further assume that the oldest entry which System X requires is 001; the oldest entry which System Z requires is 004; and that System Y is not active, at this time (see FIG. 11*b*). Then, when System X updates the vector with the oldest entry it still needs (e.g., block id 006 of FIG. 11*a*), as depicted in FIG. 11*c,* System X determines if its entry previously contained the lowest block id of the vector. In this example, the entry contained block id 001, which is the lowest. Thus, System X deletes all entries lower than the new lowest block (e.g., block id 004). That is, block ids 003–001 are physically removed from the primary log stream, and block id 004 becomes the new tail of the log stream. This completes the tail deletion.

The frequency with which a multisystem log stream is compressed by systems of the multisystem environment impacts system performance. Thus, in accordance with the principles of the present invention, the frequency at which a particular system of the multisystem environment compresses a log stream is based on heuristics. That is, each system adjusts its compression rate (i.e., the frequency at which it compresses) in real-time based on the compression rates of the other systems connected to the log stream. This ensures a minimal sized log stream and increases the likelihood that the log stream is contained solely within the coupling facility. This, in turn, positively affects system performance.

Figure 12:
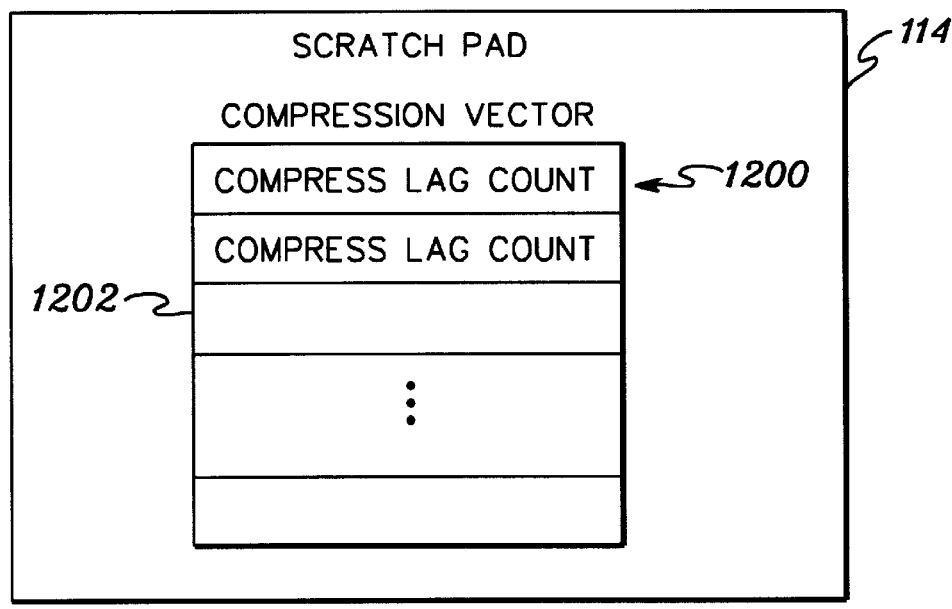
FIG. 12 depicts one example of a compression vector used in accordance with the principles of the present invention.

In accordance with the principles of the present invention, in order to pace the frequency at which a log stream is compressed by the systems of the multisystem environment, a compression vector is used. In one embodiment, a compression vector 1200 is maintained within scratch pad 114 of the coupling facility, as depicted in FIG. 12.

Compression vector 1200 includes a plurality of entries 1202. There is one entry 1202 for each system coupled to the log stream to be compressed. Each entry includes a compress lag count, which is a number ranging in value from zero to 255, as one example. The number is used to represent each system's compression activity for the log stream relative to the other systems' compression activity for the log stream. Thus, the compress lag count does not represent the number of compressions for the log stream performed by the system associated with that count, but instead indicates the number of compressions for each system relative to the number of compressions for the other systems.

Figure 13:
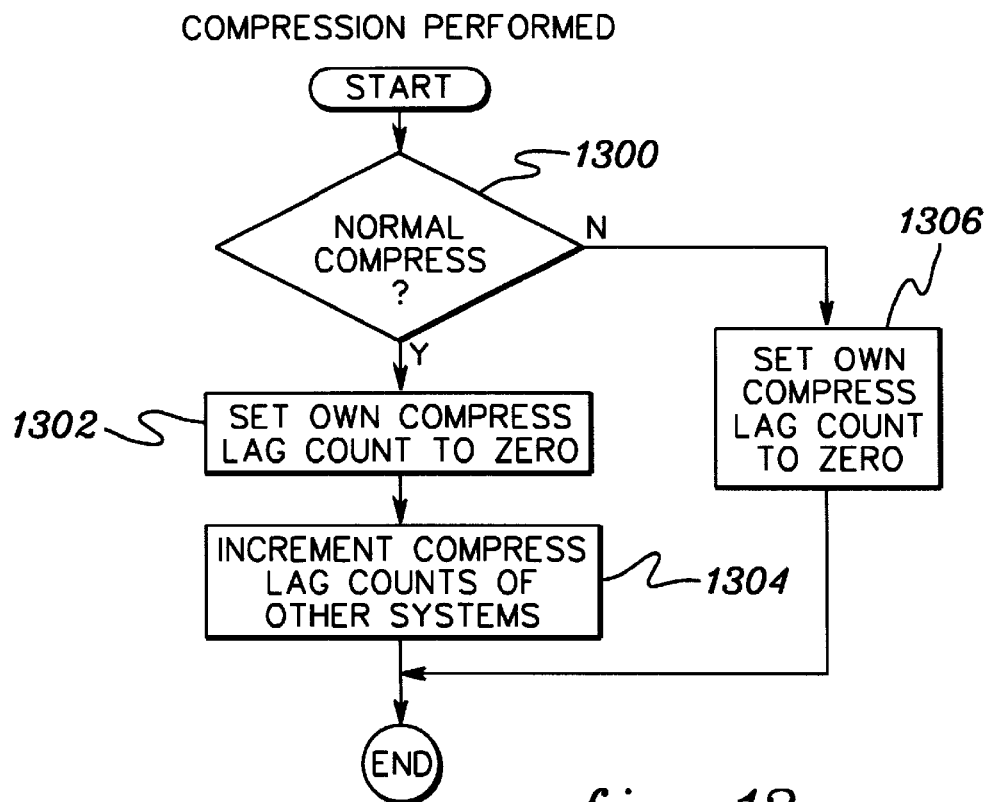
FIG. 13 depicts one embodiment of the logic used in updating a compression lag count stored in the compression vector of FIG. 12, in accordance with the principles of the present invention.

The compress lag count(s) get updated when a compression is performed, and one embodiment for updating the compress lag counts is described with reference to FIG. 13. The logic of FIG. 13 is performed by, for instance, the sync point manager of a system that performed a compression. Thus, if System X performed a compression, then sync point manager X would perform the update.

Referring to FIG. 13, when a compression is performed by a system (e.g., System X), an initial determination is made as to whether the compression was performed because the system detected that a predefined number (e.g., 100) of logically deleted entries existed on its main queue, STEP 1300. (This type of compression is referred to herein as a "normal compression", which is described with reference to FIG. 6.)

Should the compression be a normal compression, then the compress lag count for the system (e.g., System X) is set to zero, STEP 1302, and the compress lag counts of any other systems coupled to the log stream are incremented by one or set to 255 (whichever is the minimum thereof), STEP 1304. This completes the update.

Returning to INQUIRY 1300, if the compression is not a normal compression, but instead a forced compression (referred to herein as a CompressAll, which is described below), then the compress lag count of the system performing the compression is set to zero, STEP 1306, and the other compress lag counts are not adjusted.

Figure 14:
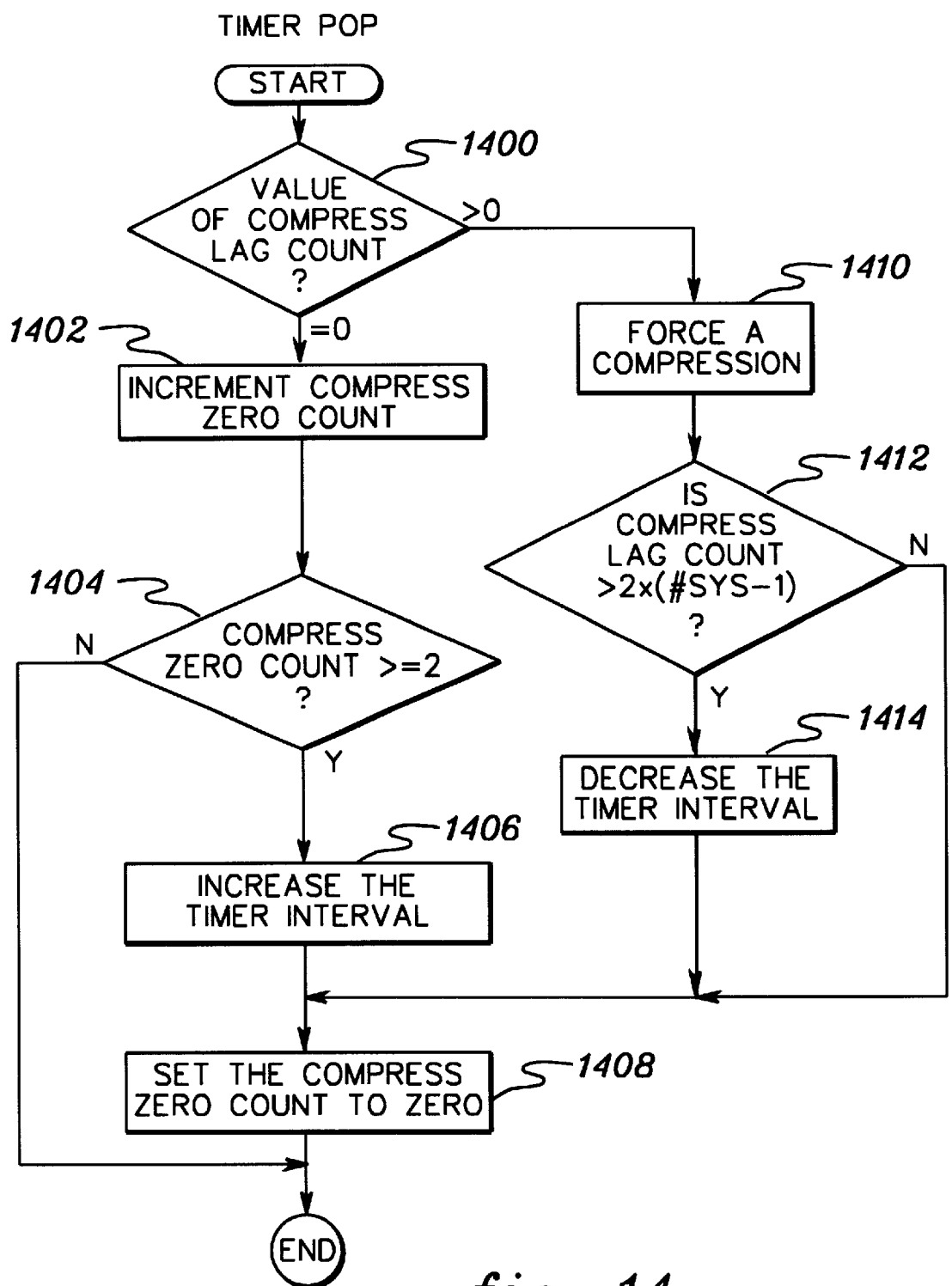
FIG. 14 depicts one embodiment of the logic used during a timer pop routine, to determine whether a compression is to be forced, in accordance with the principles of the present invention.

The use of the compress lag counts are further described with reference to FIG. 14. The logic of FIG. 14 is performed by a sync point manager of a system coupled to the log stream, when a timer associated with the system triggers indicating that a determination should be made as to whether a forced compression should be performed. In particular, when a timer associated with a system pops (i.e., the predetermined time interval has elapsed), the compress lag count for that system is checked to determine if the sync point manager needs to perform a CompressAll for the log stream in order to allow a tail delete to be performed. If a system is not performing normal compressions as frequently as other systems, then the sync point manager detects that a forced compression is necessary.

Referring to FIG. 14, initially the value of the compress lag count of the system associated with the timer pop (e.g., assume System Z in this one illustrative example) is checked, INQUIRY 1400. If the value of the compress lag count for System Z is equal to zero indicating that it is performing normal compressions at least as frequently as the other systems, then a compress zero count associated with System Z is incremented by one, STEP 1402. The compress zero count is kept in local storage (i.e., it is not available to other systems) and is used and updated by the local system (e.g., System Z, in this example). It is used to determine if the predetermined time interval of the timer pop should be adjusted.

Thereafter, the compress zero count is checked to determine if it is greater than or equal to 2, INQUIRY 1404. Should the compress zero count be less than two, then no adjustments are made and the timer pop routine is complete. However, should the value of the compress zero count be greater than or equal to two, then the timer is popping too frequently, and as a result, excessive amounts of processing time is being used to check whether or not a forced compression (CompressAll) is required. Therefore, the timer interval is increased, STEP 1406. In one example, it is doubled, but it does not go beyond a maximum interval. This decreases the number of times that the timer pops.

In addition to the above, the compress zero count is set to zero, STEP 1408, and processing of the timer pop routine is complete.

Figure 15A:
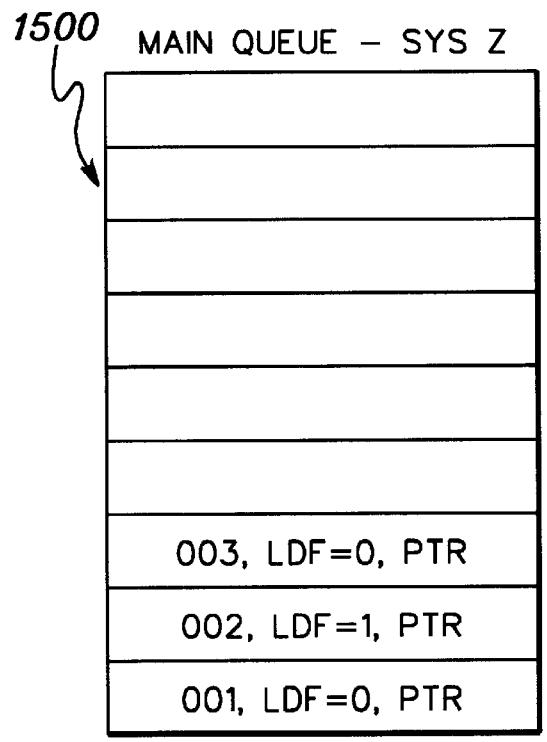
FIGS. 15a–15b depict examples of a main queue for a System Z, used in accordance with the principles of the present invention.
Figure 15B:
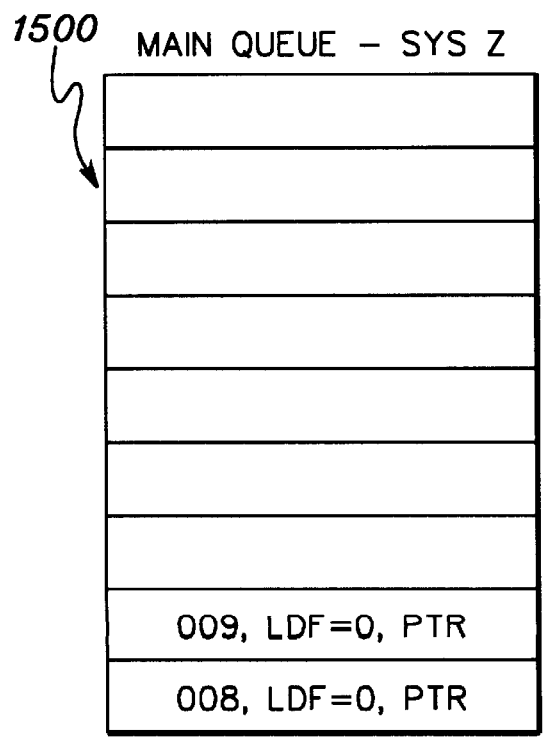

Returning to INQUIRY 1400, if the value of the compress lag count is greater than zero indicating that System Z is not compressing frequently enough, relative to the other systems coupled to the log stream, then the sync point manager of System Z performs a forced compression, STEP 1410. In one embodiment, the forced compression includes having all of the entries on the main queue of System Z that are not logically deleted rewritten onto the primary log stream and onto the main queue. For example, refer to FIG. 15. If System Z has three entries on its main queue 1500, including block ids 001–003, and two of those entries have not been logically deleted, namely block id 001 and block id 003, then those two entries are rewritten onto the head of the primary log stream and accordingly, are given new block ids. Assuming. that new block id 008 corresponds to old block id 001 and new block id 009 corresponds to old block id 003, then block id 008 and block id 009 are rewritten onto the main queue of System Z, as illustrated in FIG. 15b. As is shown, block id 002 is not rewritten onto the main queue or onto the primary log stream, since it is no longer wanted (i.e., it has been logically deleted).

Returning to FIG. 14, subsequent to performing the forced compression by System Z, a determination is made as to whether the compress lag count of System Z is greater than a selected value, such as two times (the number of systems connected to the log stream minus one) (i.e., is compress lag count<2×(#sys−1)). This indicates that System Z has a slower transaction rate than at least one of the other systems coupled to the log stream and is compressing its log stream less frequently. In order to account for this difference, the timer pop is adjusted in real-time in order to cause more frequent compressions. Should the compress lag count be greater than the selected value, then the timer interval is decreased, so that it is triggered more frequently, STEP 1414. In one example, the timer interval is halved. Thereafter, the compress zero count for System Z is set to zero, STEP 1408, and processing of the timer pop routine is complete.

Returning to INQUIRY 1412, if the compress lag count is not greater than the selected value, then there is no need to decrease the timer interval, at this point. Therefore, the compress zero count for System Z is set to zero, STEP 1408, and processing is complete.

Described above is a capability that provides for the adjusting, in real-time, of the frequency with which a system compresses a log stream. Compression is performed whenever a system detects that its main queue has a predefined number of logically deleted entries, such as 100 logically deleted entries. Additionally, compression is performed when the timer associated with a system has popped and another system has performed a compression, but the system of the popped timer has not. The frequency with which the timer pops, is also controlled, in accordance with the principles of the present invention, such that the timer pop does not use up excessive amounts of processing time.

Each sync point manager performs a compress or a CompressAll at the speed of the fastest system that is processing an active workload. For example, if one system is processing 100 transactions per second and the other two systems coupled to the log stream are processing one transaction per second, then the other two systems are to issue a compress or a CompressAll at the 100 transactions per second rate. If this is not accomplished, then the log stream will start to grow in size, since the faster system is prevented from issuing tail deletes by the slower systems.

As described above, a log stream includes one or more datum (e.g., log data). Thus, other entities that include one or more datum are included within the definition of a log stream. These entities include, but are not limited to, log files and log data sets.

The multisystem environment described above is only one example. The present invention can be used and/or incorporated within other systems or environments without departing from the spirit of the present invention. For example, different architectures and/or operating systems can be used without departing from the spirit of the present invention. As another example, one or more central processing complexes are coupled to the coupling facility, and each central processing complex includes one or more central processing units, which executes an operating system. Further, in another embodiment, the computer system can include multiple coupling facilities. Additionally, the present invention is applicable to computer systems that do not include a coupling facility.

Further, other components of the system can also have log streams associated therewith that can be managed and compressed by the present invention without departing from the spirit or scope of the present invention.

In yet a further embodiment, the system logger can be a separate component from the operating system. Further, components other than the system logger can write to and delete entries from the log stream. In yet a further embodiment, the sync point manager is not the only component that can perform compression or pace the compression. In another embodiment, other components of the system perform the compression and/or pacing techniques, including, but not limited to, the resource managers. Again, the multisystem environment described herein is only one example.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A pacing system for pacing the frequency at which multisystem log streams are compressed, said pacing system comprising:
    means for ascertaining a rate at which a multisystem log stream is compressed by one system of a multisystem environment, said rate being relative to how frequently said multisystem log stream is compressed by at least one other system of said multisystem environment; and
    means for adjusting, in real-time, the frequency at which said one system compresses said multisystem log stream.

2. The pacing system of claim 1, wherein said means for ascertaining comprises checking a compress lag count of said one system, said compress lag count representing the rate at which said one system is compressing said multisystem log stream relative to how frequently said multisystem log stream is compressed by said at least one other system.

3. The pacing system of claim 2, further comprising means for updating said compress lag count when said one system compresses said multisystem log stream.

4. The pacing system of claim 3, further comprising means for setting at least one other compress lag count of said at least one other system, when said one system compresses said multisystem log stream.

5. The pacing system of claim 1, wherein said means for adjusting comprises means for increasing the frequency at which said one system compresses said multisystem log stream, when said ascertained rate indicates that said one system is compressing said multisystem log stream at a slower rate than said at least one other system.

6. The pacing system of claim 5, wherein said means for increasing comprises forcing a compression to be performed by said one system.

7. The pacing system of claim 5, further comprising means for determining, at predefined time intervals, whether said ascertained rate is indicating that the frequency at which said one system compresses is to be increased.

8. The pacing system of claim 7, further comprising means for decreasing the time of said predefined time intervals, when it is determined that the ascertained rate of said one system has a predetermined relationship with a selected value.

9. The pacing system of claim 8, wherein said means for decreasing comprises decreasing by half the time of said predefined time intervals, when it is determined that the ascertained rate is greater than two times (a number of systems coupled to said multisystem log stream minus one).

10. The pacing system of claim 1, further comprising means for comparing, at predefined time intervals, said ascertained rate to a predefined value to determine whether the frequency at which said one system compresses is to be adjusted.

11. The pacing system of claim 10, wherein said adjusting is performed when said ascertained rate has a predefined relationship with said predefined value.

12. The pacing system of claim 10, further comprising means for decreasing the time of said predefined time intervals, when it is determined that the ascertained rate of said one system has a predetermined relationship with a selected value.

13. The pacing system of claim 10, further comprising means for increasing the time of said predefined time intervals, when it is determined that said comparing is to be performed less frequently.

14. The pacing system of claim 1, wherein said multisystem log stream is at least partially located within a coupling facility, said coupling facility being coupled to said one system and said at least one other system of said multisystem environment.

15. A pacing system for pacing the frequency at which multisystem log streams are compressed, said pacing system comprising:
    means for ascertaining a rate at which a multisystem log stream is compressed by one system of a multisystem environment, said rate being relative to how frequently said multisystem log stream is compressed by at least one other system of said multisystem environment;
    means for comparing, at predefined time intervals, said ascertained rate to a predefined value to determine whether the frequency at which said one system compresses said multisystem log stream is to be adjusted;
    means for adjusting, in real-time, the frequency at which said one system compresses said multisystem log stream, when said comparing indicates adjusting;
    means for determining whether the time of said predefined time intervals is to be modified; and
    means for modifying the time of said predefined time intervals to adjust how often said comparing is performed, when it is determined that the time is to be modified.

16. The pacing system of claim 15, wherein said means for comparing indicates that the frequency of compression by said one system is to be increased.

17. The pacing system of claim 16, wherein said means for determining indicates the time is to be decreased, wherein said comparing is performed more frequently.

18. The pacing system of claim 15, wherein said means for determining indicates the time is to be increased, wherein said comparing is performed less frequently.

19. A pacing system for pacing the frequency at which multisystem log streams are compressed, said pacing system comprising:
    a system of a multisystem environment adapted to ascertain a rate at which a multisystem log stream is compressed by said system, said rate being relative to how frequently said multisystem log stream is compressed by at least one other system of said multisystem environment; and
    said system being further adapted to adjust, in real-time, the frequency at which said system compresses said multisystem log stream.

* * * * *